United States Patent [19]
Felzer

[11] 3,881,742
[45] May 6, 1975

[54] MOTOR VEHICLE ENERGY-ABSORBING FORWARD STRUCTURE

[75] Inventor: Bertold Felzer, Russelsheim, Main, Germany

[73] Assignee: General Motors Corporation, Detroit, Mich.

[22] Filed: Oct. 5, 1973

[21] Appl. No.: 403,849

[52] U.S. Cl............................. 280/106 R; 293/63
[51] Int. Cl............................................. B62d 21/00
[58] Field of Search........ 280/106 R, 106 T; 293/63

[56] References Cited
UNITED STATES PATENTS
3,105,701 10/1963 Schilberg.................. 280/106 R
3,499,661 3/1970 Rowe............................ 280/106 R

*Primary Examiner*—Philip Goodman
*Attorney, Agent, or Firm*—Herbert Furman

[57] ABSTRACT

The forward structure of a motor vehicle includes deflector elements behind the front wheels which deflect the front wheels outwardly as the forward structure collapses under impact and the front wheels engage the deflector elements.

2 Claims, 7 Drawing Figures

MOTOR VEHICLE ENERGY-ABSORBING FORWARD STRUCTURE

This invention relates to an energy absorbing forward structure for motor vehicles for absorbing energy in the event of a frontal impact.

It is known that the forward structure of a motor vehicle converts energy by deformation in the event of a frontal impact. It is also known to make arrangements, whereby in the event of a frontal impact, the engine is able to move rearwards relative to the forward structure of the motor vehicle under the passenger compartment to increase the effective deformation length of the forward structure.

According to this invention, deflective elements are located at the rear portions of the wheel arches of the front wheels to deflect the front wheels laterally outwardly upon collapse of the forward structure and movement of the front wheels into engagement with the deflecting elements. This takes the front wheels out of the deformation path of collapse of the forward structure. The steering linkage bends as the front wheels are deflected outwardly.

According to one embodiment of the invention, a wedge-shaped deflecting element is attached to the rear wall of each front wheel arch approximately on a level with the wheel center. Turning to another embodiment, the portions of the lower side members of the vehicle frame are located obliquely in the region of the rear walls of the front wheel arches to serve as the deflecting elements. In this embodiment, no additional deflecting elements are needed. The obliquely located portions of the vehicle frame side members are arranged at the rear walls of the front wheel arches approximately on a level with the wheel centers. In each embodiment of the invention, the deflecting elements deflect the front wheels laterally outwardly when engaged by the front wheels upon collapse of the forward structure of the vehicle under frontal impact.

Further details and advantages may be gathered from the following drawing wherein.

Figure 1:
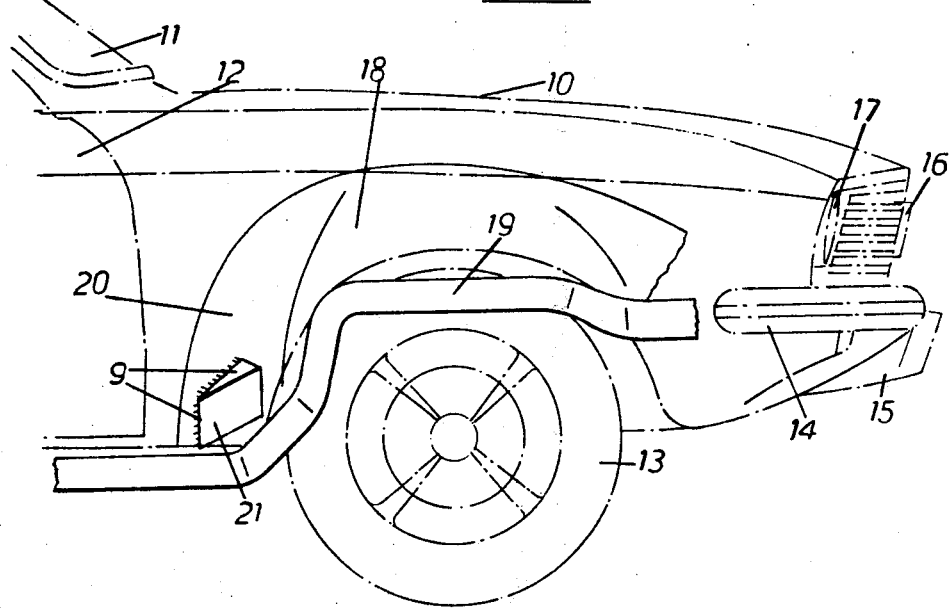
FIG. 1 is a side elevational view of the forward structure of a motor vehicle.

In FIG. 1, reference numeral 10 designates the engine bonnet, 11 the windscreen, 12 the right-hand forward door and 13 the right-hand front wheel of the passenger car. Also visible are the front bumper 14 with buffer member 15, as well as the radiator grille 16 with a headlamp 17. In full lines, are shown the contours of the right-hand wheel arch 18 and also of the right-hand outer side-member 19, in so far as it lies within the region of the wheel arch 18. In order to obtain a view inside the wheel arch 18, this latter is shown not covered over by the side wall of the wing. A wedge-shaped deflecting element 21 is attached to the rear wall 20 of the wheel arch 18. Appropriately, the element 21 consists of sheet-metal parts of adequate strength which are welded together. They can be joined to the rear wall 20 of the wheel arch, also by welding or even by a screwed connection. In the embodiment shown, the welding seam 9 will be apparent.

Figure 2:
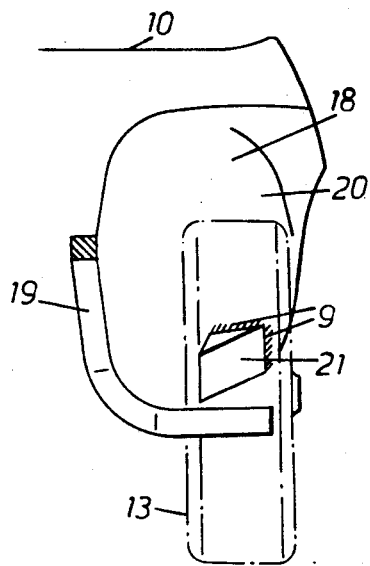
FIG. 2 is a front view of the left hand front wheel arch.

In FIG. 2, it will be apparent that the left front wheel arch is shaped in the same manner. Therefore, the parts are designated in FIG. 2 with the same numerals as in FIG. 1. For the sake of simplicity, the additional bracing members of the elements 21 to connect with the bodywork structure, have been omitted.

Figure 3:
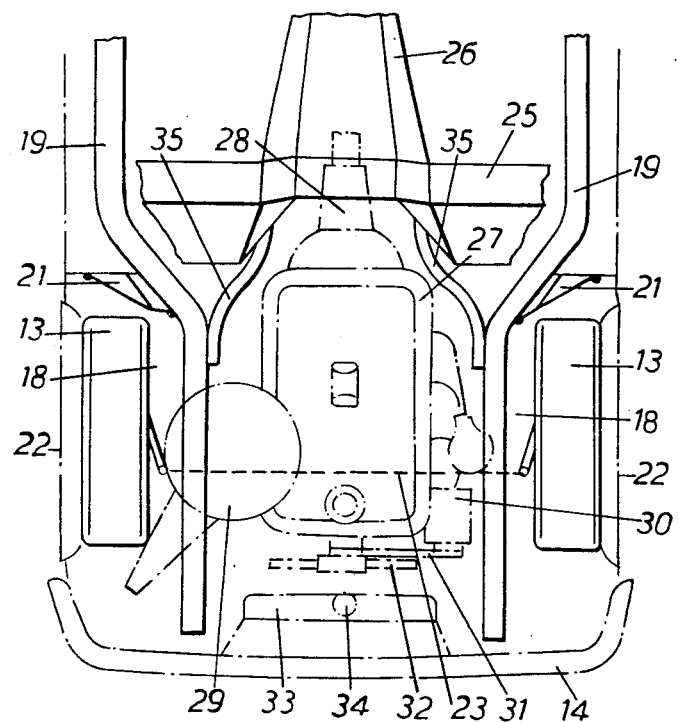
FIG. 3 is a plan view of the motor vehicle.
Figure 4:
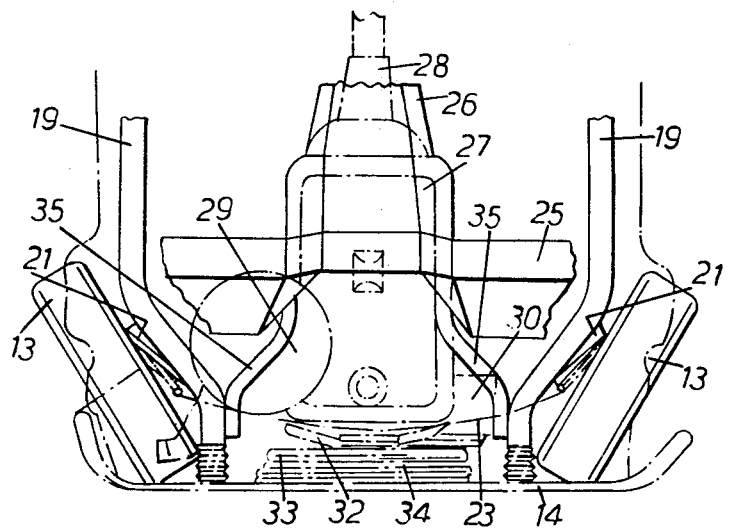
FIG. 4 is a view corresponding to FIG. 3 after the frontal impact of the vehicle with an obstacle.

The same applies to the FIGS. 3 and 4 in which the front wheel arch 18 is shown at both sides in plan. Also apparent from FIGS. 3 and 4 are the outlines 22 of the forward bodywork designed as the so-called crumpling zone; further, the schematically indicated steering linkage 23 and a part of the floor 25 of the passenger compartment with transmission tunnel 26 for the sake of completeness, dash-dot lines also indicate the engine block 27 with flanged-on transmission block 28, the air filter 29, the generator 30 with V-belt 31, the fan blade 32 and the radiator 33 with filler pipe 34 for the cooling water.

The mode of operation of the deflecting elements 21 will now be apparent from FIG. 4. After the vehicle has collided with a frontal obstacle, the forward structure of the bodywork is compressed to a fraction of its original length, whilst converting kinetic energy into deformation work. The front wheels 13 coming into contact with the bumper 14 are moved into engagement with the deflecting elements 21. The angle of inclination of the elements 21 with respect to the wheel planes, develops force components in a transverse direction which deflect the wheels 13 outwards. The steering linkage 23 bends as indicated in FIG. 4. As illustrated in FIG. 4, the engine block 27 is pushed into the transmission tunnel 26 whilst being directed at both sides by guide members 35.

Figure 5:
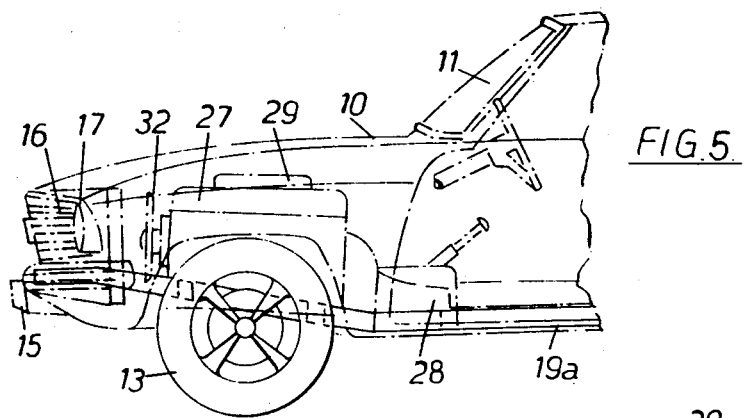
FIG. 5 is a side elevational view of another embodiment of the invention.
Figure 6:
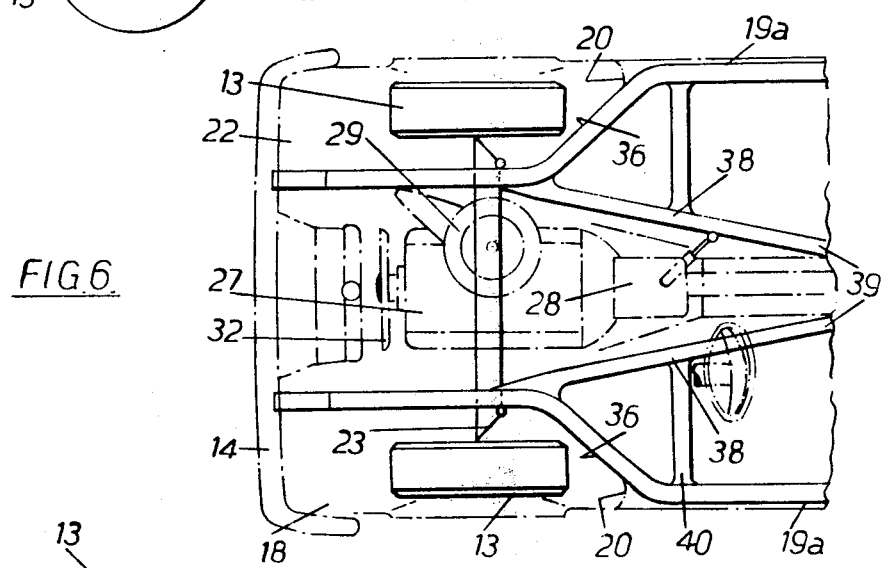
FIG. 6 is a plan view of the vehicle shown in FIG. 5.
Figure 7:
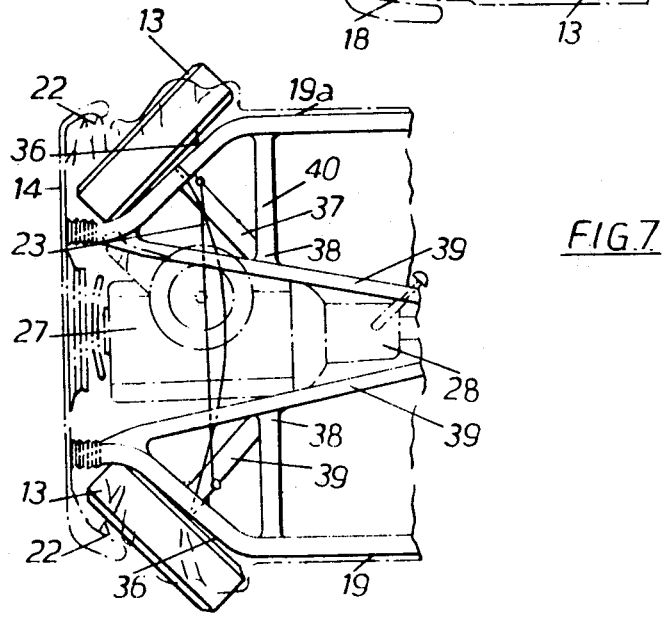
FIG. 7 is a view corresponding to FIG. 6 after frontal impact of the vehicle with an obstacle.

In the embodiment according to FIGS. 5 to 7, the parts which correspond with the embodiment according to FIGS. 1 to 4, have with identical reference numerals. Here, the difference compared with FIGS. 1 to 4, resides chiefly in the fact that the oblique faces 36 of the outer longitudinal side-members 19a themselves serve as deflecting elements for the wheels 13. The oblique faces 36 are arranged directly behind the rear walls 20 of the wheels arches 18, approximately on a level with the wheel centres (FIGS. 5 and 6).

According to FIG. 7, a stiffening girder 37 is provided for each oblique face 36. These stiffening girders 37, which are intended to prevent an inward kinking of the oblique faces 36, are secured, on the one hand at junction points 38 of each of the two inner longitudinal side-members 39 with a rear cross-member 40, and on the other hand approximately at the centre of the oblique faces 36.

I claim:

1. A motor vehicle comprising, in combination, a forward vehicle structure collapsible upon impact of the vehicle with an obstacle and including a frame, a pair of front wheels mounted on the forward vehicle structure, and a deflector element on the vehicle respective to each front wheel and located rearwardly thereof, each element being independent of the frame and including a deflector surface extending angularly and outwardly of the vehicle structure and lying in a horizontal plane including the wheel center, collapse of the forward vehicle structure moving the wheels into engagement with the deflector surfaces of the respective deflector elements to force the wheels angularly and outwardly of the vehicle.

2. A motor vehicle comprising, in combination, a forward vehicle structure collapsible upon impact of the vehicle with an obstacle, a pair of front wheels mounted on the forward vehicle structure, and a generally wedge shaped deflector element on the vehicle respective to each front wheel and located rearwardly thereof, each element including a deflector surface extending angularly and outwardly of the vehicle structure generally coplanar with a respective wheel center, collapse of the forward vehicle structure moving the wheels into engagement with the deflector surfaces of the respective deflector elements to force the wheels angularly and outwardly of the vehicle.

* * * * *